(12) United States Patent
Amano

(10) Patent No.: US 9,019,531 B2
(45) Date of Patent: Apr. 28, 2015

(54) HOST COMPUTER, PRINT CONTROL SYSTEM, CONTROL METHOD FOR PRINT CONTROL SYSTEM, AND PROGRAM

(75) Inventor: Hiroyuki Amano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/469,651

(22) Filed: May 11, 2012

(65) Prior Publication Data

US 2012/0293835 A1 Nov. 22, 2012

(30) Foreign Application Priority Data

May 16, 2011 (JP) ................. 2011-109541

(51) Int. Cl.
*G06F 3/12* (2006.01)
*G06K 15/00* (2006.01)

(52) U.S. Cl.
CPC .............. *G06F 3/121* (2013.01); *G06F 3/1229* (2013.01); *G06F 3/1267* (2013.01); *G06F 3/1274* (2013.01); *G06F 3/1285* (2013.01); *G06F 3/122* (2013.01); *G06F 3/1268* (2013.01)
USPC ........................... 358/1.15; 358/1.1; 358/1.13

(58) Field of Classification Search
None
See application file for complete search history.

(56) References Cited

U.S. PATENT DOCUMENTS

| | | | | |
|---|---|---|---|---|
| 5,995,718 A | * | 11/1999 | Hiraike et al. | 358/1.11 |
| 6,459,497 B1 | * | 10/2002 | Kashiwazaki | 358/1.15 |
| 7,796,281 B2 | * | 9/2010 | Tsuzuki | 358/1.14 |
| 7,855,796 B2 | * | 12/2010 | Kitada | 358/1.15 |
| 8,374,521 B2 | * | 2/2013 | Nishikawa | 399/82 |
| 8,743,401 B2 | * | 6/2014 | Yamada | 358/1.15 |
| 2003/0056146 A1 | * | 3/2003 | Freeman et al. | 714/25 |
| 2005/0063001 A1 | * | 3/2005 | Tanimoto | 358/1.15 |
| 2005/0100378 A1 | * | 5/2005 | Kimura et al. | 400/76 |
| 2005/0200878 A1 | * | 9/2005 | Nakazato | 358/1.13 |
| 2005/0225797 A1 | * | 10/2005 | Harada | 358/1.15 |
| 2007/0121161 A1 | * | 5/2007 | Yamada | 358/1.16 |
| 2007/0165248 A1 | * | 7/2007 | Utsunomiya et al. | 358/1.1 |
| 2008/0266600 A1 | * | 10/2008 | Itoh | 358/1.15 |
| 2010/0134822 A1 | * | 6/2010 | Kimura et al. | 358/1.14 |
| 2010/0328711 A1 | * | 12/2010 | Sugiyama | 358/1.15 |
| 2012/0033236 A1 | * | 2/2012 | Tsugimura | 358/1.2 |
| 2012/0250703 A1 | * | 10/2012 | Suzuki | 370/474 |
| 2013/0003105 A1 | * | 1/2013 | Yamada | 358/1.14 |
| 2013/0021646 A1 | * | 1/2013 | Ichikawa | 358/1.15 |

FOREIGN PATENT DOCUMENTS

| | | |
|---|---|---|
| JP | H05-270065 A | 10/1993 |
| JP | 6-237347 A | 8/1994 |
| JP | 2000-029652 A | 1/2000 |
| JP | 2010-092338 A | 4/2010 |

* cited by examiner

*Primary Examiner* — Satwant Singh
(74) *Attorney, Agent, or Firm* — Canon USA, Inc., I.P. Division

(57) ABSTRACT

A host computer acquires a usage amount of a memory of a printing apparatus upon accepting a print instruction, and if the acquired free capacity of the memory is greater than a predetermined value, transmits generated print data based on the accepted print instruction. If the acquired free capacity of the memory is less than the predetermined value, the host computer displays a message before transmitting the print data.

5 Claims, 6 Drawing Sheets

FIG.6

REMAINING AMOUNT OF MEMORY HAS BECOME SMALL.

CONTINUE PRINTING

SUSPEND PRINTING

HOST COMPUTER, PRINT CONTROL SYSTEM, CONTROL METHOD FOR PRINT CONTROL SYSTEM, AND PROGRAM

BACKGROUND OF THE INVENTION

1. Field of the Invention

The present invention relates to a print control system including a host computer and a printing apparatus, and more particularly, relates to a print control system that suitably transmits print data to the printing apparatus from the host computer depending on a usage status of a memory of the printing apparatus.

2. Description of the Related Art

There is known a print control system in which print data transmitted from a host computer, such as a personal computer (PC), is stored in a printing apparatus without printing the print data immediately, and print processing is executed when a user has performed operation for printing in front of the printing apparatus. In such a print control system, for example, when the user gives a print instruction to the host computer, the host computer causes the user to input password, and transmits the print data added with the input password to the printing apparatus. Then, when the user has input a correct password on an operation screen of the printing apparatus, printing apparatus performs printing based on the print data attached with the password. Such a print control system is useful, for example, in a case where the printing apparatus is a shared printer connected to a network, and it is advisable that the printed products are not seen by other people.

In this regard, Japanese Patent Application Laid-Open No. 6-237347 discusses a printing apparatus (image processing apparatus) that, when executing a copy job, checks a usage status of a memory, and if a remaining memory capacity falls below a threshold value, warns that the job cannot be executed.

However, in a system in which the print data transmitted from the host computer is retained in the printing apparatus, the print data continues to be stored in the memory of the printing apparatus until the user inputs password on the operation screen of the printing apparatus. Therefore, the memory of the printing apparatus will be occupied by the print data for a long time, and as a result, there is a possibility that other jobs cannot be executed.

Further, even if execution of jobs is restricted by the printing apparatus based on the usage status of the memory, it is not until the user goes to the front of the printing apparatus that the user who has given print instruction to the host computer knows that the job cannot be executed. Therefore, the user needs to return to the host computer and to give the print instruction after waiting for the remaining memory capacity to fall below the threshold value, and thus it is inefficient.

SUMMARY OF THE INVENTION

One aspect of the present invention is directed to a system in which print data transmitted from a host computer is retained in a printing apparatus, and a usage amount of a memory of the printing apparatus is obtained by a simpler method.

According to an aspect of the present invention, a host computer that used in a printing operation includes an acceptance unit configured to accept a print instruction, an acquisition unit configured to acquire an amount of free capacity of a memory of a printing apparatus, a generation unit configured to generate print data based on the print instruction, a transmission unit configured to transmit the print data to the printing apparatus, and a control unit configured to, if the amount of free capacity of the memory is less than a predetermined value, perform control to restrict transmission of the print data and to display a message screen. The control unit, when the printing apparatus has been instructed to perform printing via the message screen, transmits to the printing apparatus a request for deleting other print data stored in the memory of the printing apparatus from the memory, and performs control to transmit the print data after confirming that the amount of free capacity of the memory has become greater than the predetermined value.

According to embodiments of the present invention, since a usage amount of memory is checked in response to a print instruction, the user can see that the job cannot be executed before transmitting the print data and going to the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a warning screen to inform that a usage amount of a memory has exceeded a threshold value, displayed by the host computer in FIG. 1.

DESCRIPTION OF THE EMBODIMENTS

Various exemplary embodiments, features, and aspects of the invention will be described in detail below with reference to the drawings.

Figure 1:
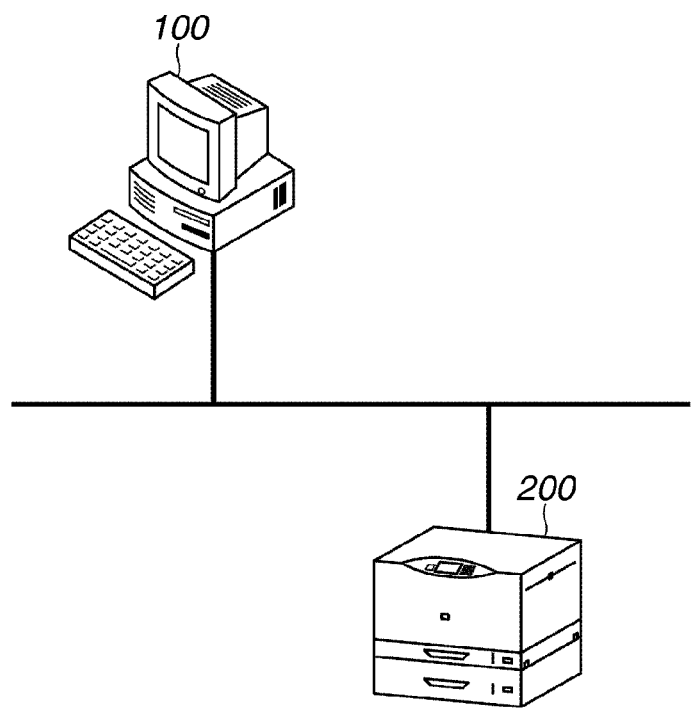
FIG. 1 illustrates a system configuration including a host computer and a printing apparatus.

FIG. 1 illustrates a configuration of a print control system including a host computer 100 and a printing apparatus 200, in an exemplary embodiment. As illustrated in FIG. 1, the host computer 100 and the printing apparatus 200 are connected to a network, and can communicate with each other.

Figure 2:
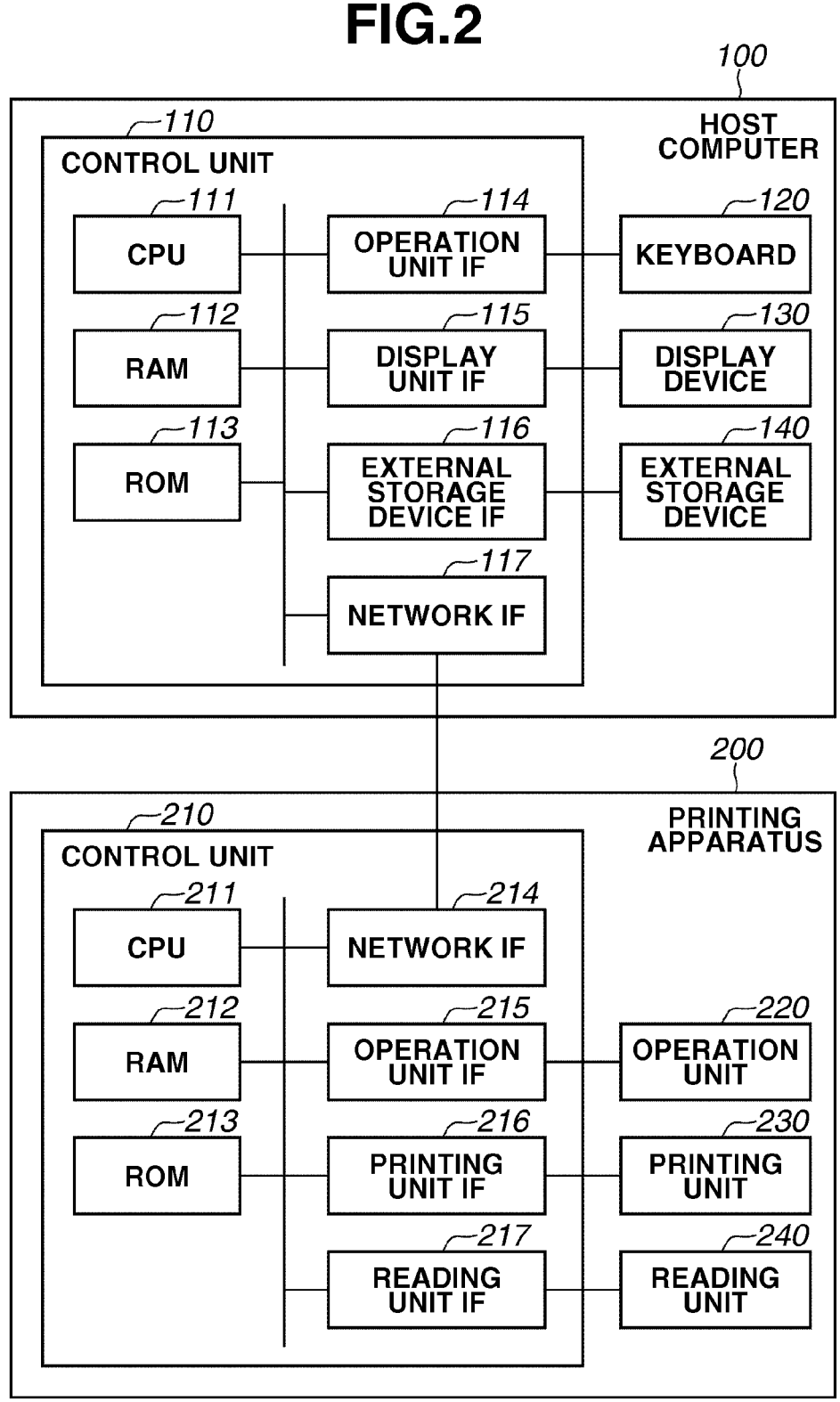
FIG. 2 is a block diagram illustrating a configuration of hardware of a system in FIG. 1.

FIG. 2 is a diagram for explaining a hardware configuration of the host computer 100 and the printing apparatus 200. The host computer 100 includes a control unit 110, a keyboard 120, a display device 130, and an external storage device 140. The control unit 110 includes a central processing unit (CPU) 111 that executes document processing or the like based on a program stored in a read-only memory (ROM) 113 or a program (or an application) stored in the external storage device 140. Further, the ROM 113 stores therein a boot program. A random-access memory (RAM) 112 functions as a main memory or a work area of the CPU 111.

An operation unit interface 114 controls a key input from the keyboard 120 or a pointing device (not illustrated). A display unit interface 115 controls display of the display device 130 such as a liquid crystal display or a cathode ray tube (CRT) display. An external storage device interface 116 controls access to the external storage device 140. The external storage device 140 stores an operating system (hereinafter, OS) serving as a control program of the CPU 111, various types of applications, font data, user files, edition files, a printer control command generation program (hereinafter, referred to as a printer driver) and so forth. In the external storage device 140, there is provided a region of a spooler or the like on which the host computer 100 manages the print data generated by the printer driver. As an example of the external storage device 140, there is a hard disk (HD) or a solid state drive (SSD). A network interface 117 connects the network and the printing apparatus 200, and performs communication control of the printing apparatus 200.

Next, a hardware configuration of the printing apparatus 200 will be described with reference to FIG. 2. The printing apparatus 200 includes a control unit 210, an operation unit 220, a printing unit 230, and a reading unit 240. The control unit 210 includes a CPU 211, and controls the printing apparatus 200. The CPU 211 executes print processing or the like, based on a control program stored in a ROM 213.

The CPU 211 communicates with the host computer 100 via a network interface 214, and notifies information within the printing apparatus 200 to the host computer 100. A RAM 212 not only functions as a main memory or a work area of the CPU 211, but is also used for an output information deployment region, an environmental data storage area, a nonvolatile RAM (NVRAM) or the like. Furthermore, the RAM 212 in the present exemplary embodiment is used as a storage area for retaining the print data until the password is input from the user. An operation unit interface 215 controls a key input from the operation unit 220. The operation unit 220 includes a switch that turns power ON/OFF, a light emitting diode (LED) display device, and various types of keys that accept operations. A printing unit interface 216 controls the printing unit 230 that prints bitmap images output from the control unit 210. A reading unit interface 217 controls the reading unit 240 that reads out original document images.

Figure 3:
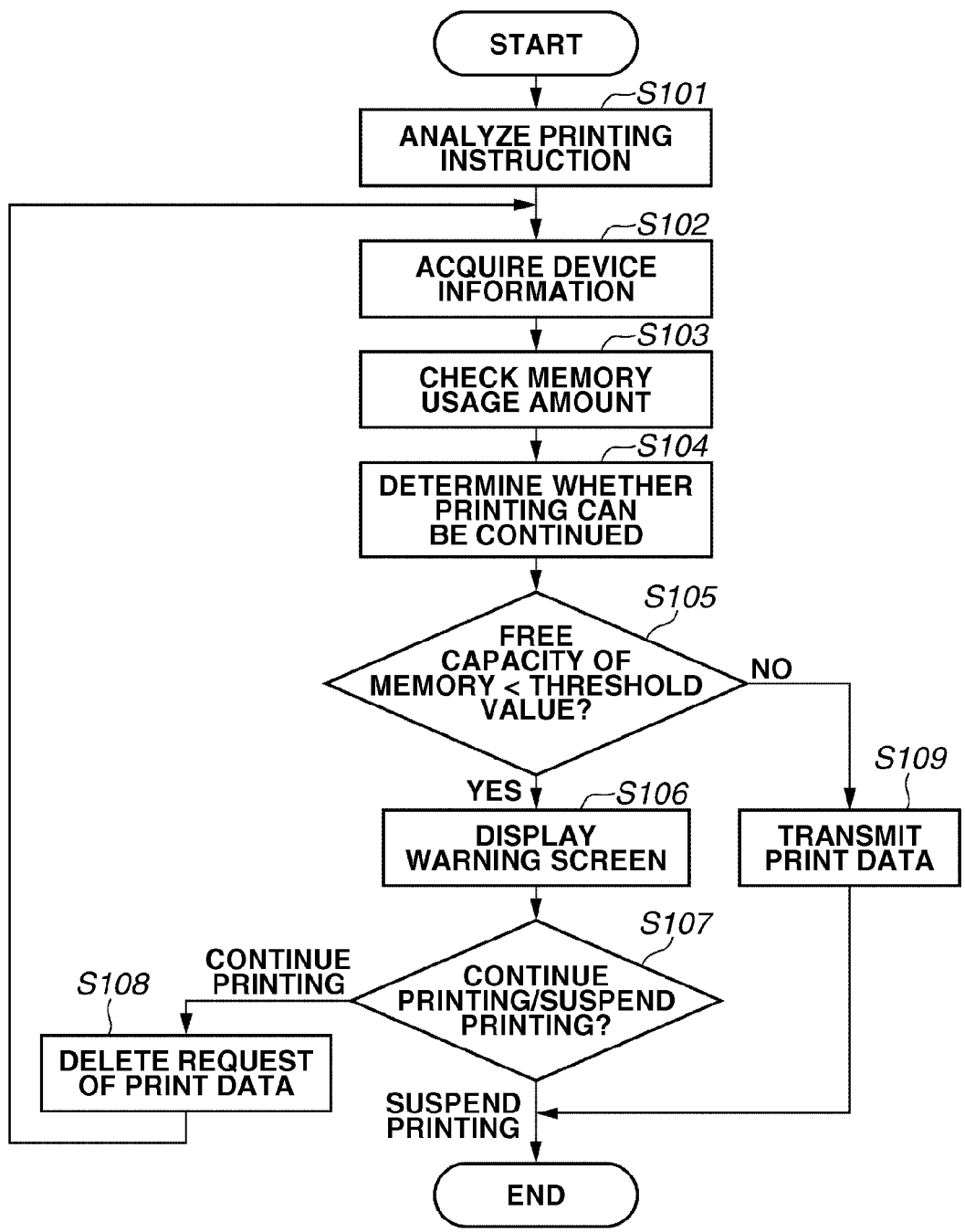
FIG. 3 is a flowchart illustrating print processing in the host computer in FIG. 1.
Figure 5:
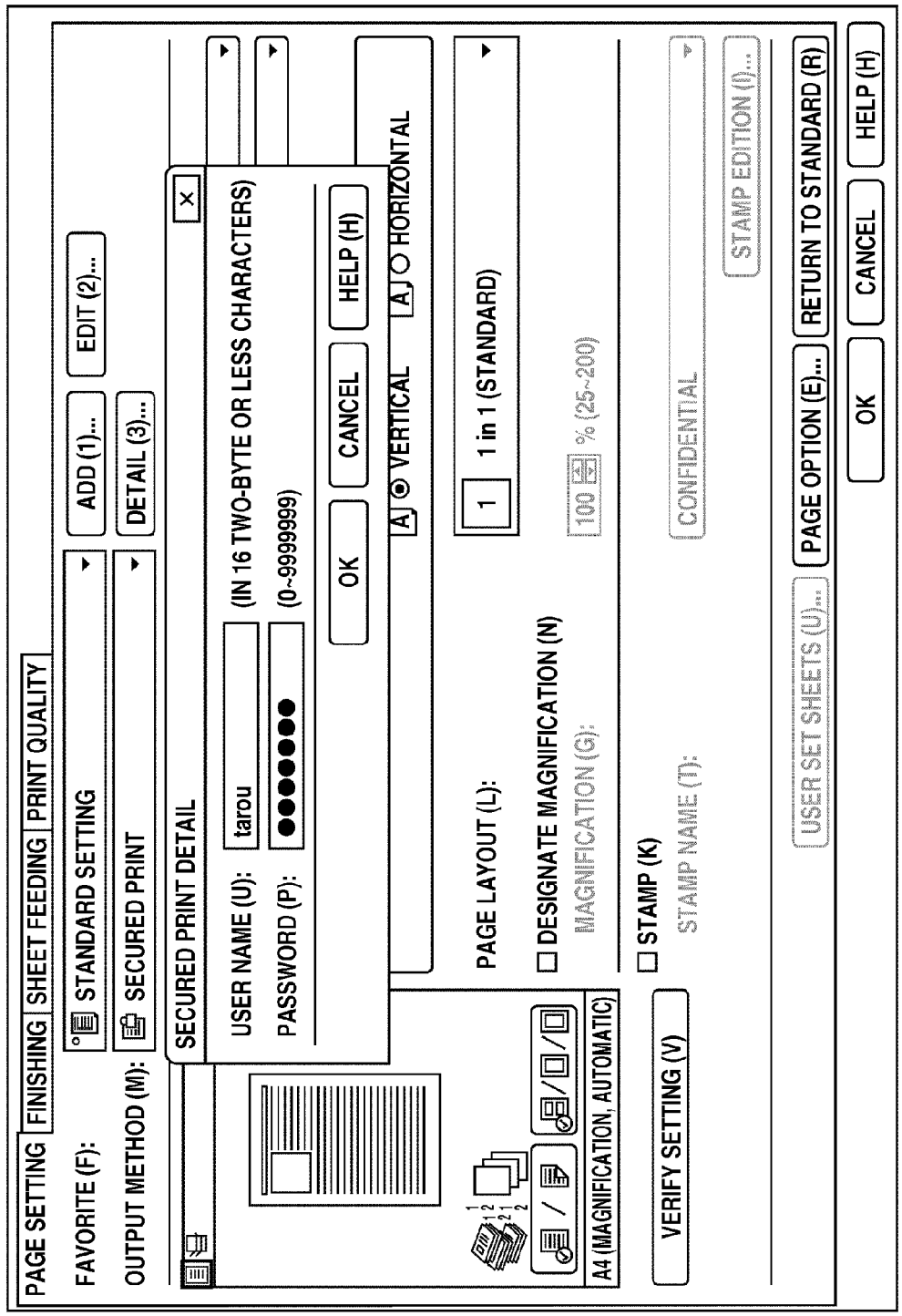
FIG. 5 illustrates an example of secured print setting screen displayed by the host computer in FIG. 1.

FIG. 3 is a flowchart illustrating print processing in the host computer 100 in the present exemplary embodiment. Each step in FIG. 3 is achieved by executing a program stored in the external storage device 140 by the CPU 111. The flowchart in FIG. 3 is started by giving print instruction on a screen in FIG. 5 displayed by the printer driver of the host computer 100.

First, in step S101, the host computer 100 activates the printer driver to print the data generated by the application, and analyzes the accepted print instruction on the screen (FIG. 5) displayed by the printer driver. The print instruction includes settings such as an output method (normal print or secured print), page layout, color/monochrome, post-processing, which the user has set on the screen in FIG. 5. The printer driver generates print data (PDL data) according to the settings.

In the present exemplary embodiment, either "normal print" or "secured print" as an output method can be selected by the user. The "normal print" is an output method for printing without operation by the user on the printing apparatus 200, after the printing apparatus 200 has received the print data generated by the printer driver. In the present exemplary embodiment, when the "normal print" is designated, the generated print data is sent to the printing apparatus 200, without performing the following processing in the output method.

The "secured print" is the output method in which password added print data (hereinafter, print data attached with password) is retained on the printing apparatus 200 side, and printing is performed in response to the user inputting the password on the printing apparatus 200. When the "secured print" is designated, the print data attached with the password can occupy the memory on the printing apparatus 200 side for a significant time period, and as a result, other processing (e.g., other print processing or copying, facsimile transmission and reception) cannot be executed can frequently occur.

To address this, the following processing is performed and transmission of the print data is controlled. However, since the "normal print" does occupy the memory as well, although typically for a shorter time period than the "secured print", the following processing may be performed in a case of the "normal print". Further, the present exemplary embodiment can be applied to all operations in which more than one application share the memory and attempt to use it at the same time.

In step S102, the printer driver, upon receiving notification designating the secured print as an output method from the user, transmits a request for acquiring a memory usage status to the printing apparatus 200, and acquires the memory usage status (e.g., free capacity of memory) as a response thereto. In the acquired information, various pieces of information indicating a configuration of the printing apparatus 200, in addition to the memory usage status, may be included. For example, an activation state of the printing apparatus, information indicating presence/absence of paper stored in a sheet feeding cassette of the printing apparatus 200, information indicating remaining toner amounts, job status currently being executed in the printing apparatus, attachment state of a finisher, etc., may be received together with the memory usage status. In a printing apparatus as described above, a configuration for acquiring information indicating a configuration of the printing apparatus at the time of the print instruction may be adopted. In such a case, the present invention can be applied by a simpler mechanism, if the memory usage status is acquired together with the information indicating the configuration of the printing apparatus.

Next, the processing proceeds to step S103 where the printer driver checks a usage amount of the memory based on the memory usage status acquired in step S102. In step S105, the printer driver determines whether the free capacity of the memory falls below a predetermined value (threshold value). If the free capacity of the memory falls below the threshold value (YES in step S105), it means that the printing apparatus 200 cannot secure enough memory area to store the print data generated by the printer driver (or print data which will be generated from now on), by reason that the printing apparatus 200 has already stored the print data. The free capacity of memory refers to a free capacity of memory which is secured as an area for storing the print data attached with the password.

The threshold value of free memory capacity is managed as a setting by the printer driver. If the free capacity of the memory acquired from the printing apparatus 200 exceeds the threshold value (if determined as not near full, that is, if NO in step S105), in step S109, the printer driver determines that enough memory area can be secured to store the print data in the memory of the printing apparatus 200, transmits the generated print data attached with the password to the printing apparatus 200, and ends the processing in the flowchart. On the other hand, if the free capacity of the memory falls below the threshold value (if determined as near full, that is, if YES in step S105), the printer driver holds the print data attached with the password in a retention area secured in the external storage device 140 of the host computer 100.

Furthermore, in step S106, the printer driver notifies the user that the free capacity of the memory falls below the threshold value and is near full (a state in which there is a possibility that the memory becomes full). More specifically, this notification is performed by displaying the warning screen in FIG. 6. When a print suspend button is pressed by the user on the warning screen in FIG. 6, in step S107, the printer driver determines that printing is suspended (SUSPEND PRINTING in step S107), and suspends transmission of the generated print data attached with the password to the printing apparatus 200. At this time, the host computer 100 deletes the print data held in the external storage device 140 of the computer itself. On the other hand, when a print continue button is pressed by the user on the warning screen in FIG. 6, in step S107, the printer driver determines that printing is continued (CONTINUE PRINTING in step S107). In step S108, the printer driver performs print-continue processing.

More specifically, it is checked whether the print data attached with the password of an owner who is the user itself is present in the memory of the printing apparatus 200. If the print data attached with the password of the owner who is the user itself is present, the printer driver makes a request for deleting the print data attached with the password. In step S105, the printer driver confirms that the free capacity of the memory has been sufficiently secured, and then the processing proceeds to step S109. In step S109, the printer driver transmits the print data attached with the password to the printing apparatus 200.

Determination whether the print data attached with the password of the owner who is the user itself is present in the memory of the printing apparatus 200 is performed by checking whether the user who has given the print instruction by the printer driver coincides with a user included in attribute information of the print data attached with the password stored in the memory of the printing apparatus 200.

In this regard, the print data of the user coinciding with the user who has given the print instruction by the printer driver may not be stored in the memory of the printing apparatus 200. In this case, the printer driver, without transmitting a deletion request for the print data in step S108 after a "particular time" has elapsed again acquires device information including the free capacity of the memory, and confirms the free capacity of the memory of the printing apparatus 200 in step S102. In other words, the processing in steps S102, S103, S104, S105, S106, and S107 are repeated.

The above-referenced "particular time" is determined by the following method. The printer driver predicts a time when the print data attached with the password is automatically deleted from the memory of the printing apparatus 200, based on a time-out period set in the print data attached with the password, and a time when the printing apparatus 200 has received the print data attached with the password. The time-out period is an effective period of time starting from when the print data attached with the password is received by the printing apparatus 200 until it is erased. When the time-out period has elapsed, the print data attached with the password will be automatically erased.

For example, it is assumed that day and time when the print data attached with the password is received by the printing apparatus 200 is 9:00 AM, May $16^{th}$, 2011, time-out period on the printing apparatus 200 is 30 minutes, and current time-of-day is 9:25 AM, May $16^{th}$, 2011. In this case, the print data attached with the password stored in the memory of the printing apparatus 200 should be automatically erased after 5 minutes.

In this example, the printer driver, after 5 minutes as the "particular time" has elapsed, again checks the free capacity of the memory of the printing apparatus 200.

In the present exemplary embodiment, as an example, if the "secured print" is selected, and the free capacity of the memory falls below the threshold value, the printer driver transmits to the printing apparatus 200 a request for deleting the print data attached with the password stored in the memory of the printing apparatus 200. However, some users do not want to delete the print data retained in the printing apparatus 200. Further, there are cases in which the print data attached with the password of which owner is the user who has given the print instruction, is not stored in the first place in the memory of the printing apparatus 200.

Thus, the following may be performed as a modified example so that the secured print can be continued even in such a case.

If CONTINUE PRINTING is instructed in step S107, the print driver changes the "secured print" to the "normal print", and transmits the print data as normal print data rather than the print data attached with the password to the printing apparatus 200. In other words, the print driver transmits to the printing apparatus 200 the print data without adding the password thereto. As a result, it is deemed on the printing apparatus 200 side that the "normal print" has been instructed. Then, the print data received in step S203 is stored in a memory secured as a region for storing the normal print data, rather than in a memory secured as a region for storing the print data attached with the password. Therefore, even when the free capacity of the memory (the memory secured as a region for storing the print data attached with the password) falls below the threshold value, printing can be continued.

In step S108, deletion of the print data attached with the password stored in the memory of the printing apparatus 200, cannot be executed as long as the password is not input by the operation unit 220 of the printing apparatus 200. However, when the print continue button is pressed on the warning screen in FIG. 6, the deletion is permitted without input of the password.

As a modified example of the processing performed in response to pressing of the print continue button on the warning screen in FIG. 6, it is also possible to perform the following processing. The printer driver holds the print data attached with the password in the external storage device 140 of the host computer 100, which causes the host computer 100 to regularly perform acquisition of the device information from the printing apparatus 200. Then, if the free capacity of the memory exceeds the threshold value, the host computer 100 transmits to the printing apparatus 200 the print data attached with the password held by the host computer 100. If a plurality of pieces of the print data attached with the password is held by the host computer 100, the host computer 100 transmits the data to the printing apparatus 200 in the order from oldest date and time when the print instruction was given by the printer driver.

As described above, the user at the host computer, in a case of having given the print instruction, can determine in advance whether to continue or cancel printing. The host computer 100 monitors a usage amount of the memory of the printing apparatus 200 at a uniform time interval, and shifts the generated print data attached with the password to a spool area of the OS as soon as free capacity is created in the memory of the printing apparatus 200, and transmits the data as usual to the printing apparatus 200. The monitoring of the amount of memory usage continues to be performed as long as there is no cancel instruction by the user while the print data attached with the password is held in a retention area secured in the host computer 100.

Figure 4:
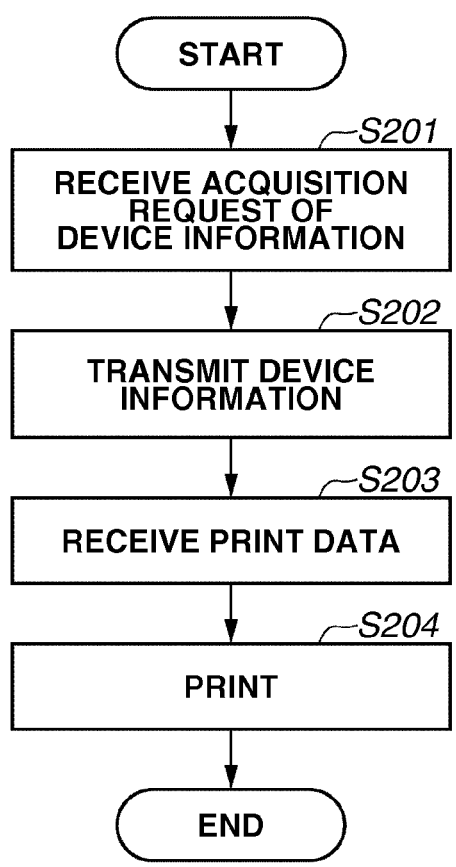
FIG. 4 is a flowchart illustrating print processing in the printing apparatus in FIG. 1.

FIG. 4 is a flowchart illustrating print processing in the printing apparatus 200. Each step in FIG. 4 is achieved by the CPU 211 executing a program stored in the ROM 213 of the printing apparatus 200. The flowchart in FIG. 4 is started when a request for acquisition of device information (information indicating configuration of the printing apparatus) is received from the host computer 100.

In step S201, the network interface 214 of the printing apparatus 200 receives a request for acquiring a memory usage status from the host computer 100. Then, the printing apparatus 200 calculates its memory usage status, and transmits calculation results to the host computer 100. The memory usage status is the proportion of empty data actually being stored to a region held in the memory in which actual data can be stored. The request for acquiring the memory usage status, as described above, may be also received together with a request for acquiring other device information. The memory usage information to be acquired may not be the proportion of empty data, but may be the proportion of actual data. Further, other information to be notified may include size of empty data being stored in the memory, actual data size of the memory, etc. . . . In other words, any information may be used as long as the information allows the user to determine whether page description language (PDL) data generated by the printer driver of the host computer 10 can be stored in the memory of the printing apparatus 200.

Then, in step S203, the printing apparatus 200, upon receiving the print data attached with the password from the host computer 100, stores the received print data in the memory and waits for input of the password from the user. Then, in step S204, in response to the password having been input in the operation unit 220 by the user, images are printed based on the print data. The print data may be stored in the memory in PDL format or may be stored as a rasterized bitmap image.

As described above, according to the present exemplary embodiment, the host computer 100, upon accepting the print instruction of the secured print, acquires a usage status of the memory from the printing apparatus 200, and if a free capacity of the memory is less than the threshold value, restricts transfer of the print data based on an instruction for the secured print to the printing apparatus. As a result, the print data is never retained in the printing apparatus, even if the free capacity of the memory is less than the threshold value. Therefore, a situation in which print jobs competing for the same memory allocation cannot be executed can be prevented. Furthermore, since acquisition of the usage status of the memory is performed at timing when the print instruction for the secured print is given, a situation can be prevented in which the user knows that printing cannot be executed due to memory full (or near full) only when the user goes to the printing apparatus (at timing when the password is input).

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-109541 filed May 16, 2011, which is hereby incorporated by reference herein in its entirety.

What is claimed is:

1. A host computer used in a printing operation, the host computer comprising:
    an acceptance unit configured to accept a print instruction from a user;
    an acquisition unit configured to acquire an amount of free capacity of a memory that is included in a printing apparatus, the printing apparatus being connected to a network and being capable of receiving print data transmitted through the network from the host computer wherein print data for a plurality of users is stored in the memory;
    a generation unit configured to generate print data based on the print instruction;
    a transmission unit configured to transmit the print data to the printing apparatus; and
    a control unit configured to, if the amount of free capacity of the memory is less than a predetermined value, perform control to restrict transmission of the print data and to display a message screen,
    wherein the control unit, when a second print instruction is accepted via the message screen by the acceptance unit from the user, performs control to transmit to the printing apparatus a request to delete other print data corresponding to the user from the memory, and performs control to transmit the print data to the printing apparatus through the network after confirming that the amount of free capacity of the memory has become greater than the predetermined value.

2. The host computer according to claim 1, wherein the print data includes user identification information, and
    wherein the control unit, when a user has instructed the printing apparatus to perform printing, performs control to transmit to the printing apparatus a request for deleting from the memory the print data including the user identification information of a user who instructed the printing.

3. A print control system comprising:
    a host computer; and
    a printing apparatus being connected to a network and being capable of receiving print data transmitted through the network from the host computer,
    wherein the host computer comprises:
    an acceptance unit configured to accept a print instruction from a user;
    an acquisition unit configured to acquire from the printing apparatus an amount of free capacity of a memory of the printing apparatus wherein print data for a plurality of users is stored in the memory;
    a generation unit configured to generate print data based on the print instruction;
    a transmission unit configured to transmit the print data to the printing apparatus through the network; and
    a control unit configured to, if the amount of free capacity of the memory is less than a predetermined value, perform control to restrict transmission of the print data, and to display a message screen,
    wherein the control unit, when the printing apparatus has been instructed to perform printing via the message screen from the user, performs control to transmit to the printing apparatus a request for deleting other print data corresponding to the user stored in the memory of the printing apparatus from the memory, and performs control to transmit the print data after confirming that the amount of free capacity of the memory has become greater than the predetermined value, and the printing apparatus comprising:
- a storage unit configured to store the print data in the memory;
- a notification unit configured to provide the amount of free capacity of the memory in response to a request of the host computer;
- a printing unit configured to print images based on the print data; and
- a deletion unit configured to delete the other print data stored in the memory upon receiving the request for deleting.

4. The print control system according to claim 3, wherein the printing apparatus further comprises an operation unit configured to accept a print instruction from a user, and wherein the printing unit prints images based on the print data stored in the memory in response to the print instruction accepted by the operation unit.

5. A control method for a print control system including a host computer and a printing apparatus, the control method comprising:

accepting a print instruction from a user;

acquiring an amount of free capacity of a memory that is included in the printing apparatus, the printing apparatus being connected to a network and being capable of receiving print data transmitted through the network from the host computer wherein print data for a plurality of users is stored in the memory;

generating print data based on the print instruction;

restricting, if the amount of free capacity of the memory is less than a predetermined value, transmission of the print data;

displaying, if the amount of free capacity of the memory is less than the predetermined value, a message screen, wherein when a second print instruction from the user is accepted via the message screen, transmitting to the printing apparatus a request for deleting other print data corresponding to the user from the memory and deleting the other print data based upon receiving the request;

transmitting, after confirming that the free capacity of the memory has become greater than the predetermined value, the print data to the printing apparatus through the network;

storing the print data in the printing apparatus; and printing images based on the print data.

\* \* \* \* \*